(12) United States Patent  (10) Patent No.: US 7,650,829 B2
Beck                       (45) Date of Patent:     Jan. 26, 2010

(54) TUBULAR PISTON FOR A PISTON ENGINE AND METHOD OF MANUFACTURING THE SAME

(75) Inventor: Josef Beck, Villingen (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 322 days.

(21) Appl. No.: 10/571,666

(22) PCT Filed: Aug. 30, 2004

(86) PCT No.: PCT/EP2004/009644

§ 371 (c)(1), (2), (4) Date: Jan. 26, 2007

(87) PCT Pub. No.: WO2005/028928

PCT Pub. Date: Mar. 31, 2005

(65) Prior Publication Data

US 2007/0125227 A1    Jun. 7, 2007

(30) Foreign Application Priority Data

Sep. 10, 2003  (DE) ................... 103 41 791

(51) Int. Cl.
*F01B 31/08* (2006.01)
*F01B 31/10* (2006.01)

(52) U.S. Cl. .................. 92/181 R; 92/176; 92/186; 29/888.04

(58) Field of Classification Search .......... 92/157, 92/158, 176, 181 R, 260, 186; 29/888.04, 29/888.042
See application file for complete search history.

(56) References Cited

U.S. PATENT DOCUMENTS

| 3,188,973 | A | * | 6/1965 | Firth et al. | 92/157 |
| 3,828,654 | A | | 8/1974 | Wiethoff | |
| 3,861,278 | A | * | 1/1975 | Forster | 92/181 R |
| 5,072,655 | A | * | 12/1991 | Adler | 92/181 R |
| 5,469,776 | A | * | 11/1995 | Martensen et al. | 92/187 |
| 5,724,733 | A | | 3/1998 | Engel et al. | |
| 6,038,960 | A | * | 3/2000 | Fukushima et al. | 92/71 |
| 6,237,467 | B1 | * | 5/2001 | Beck | 92/157 |
| 6,318,242 | B1 | * | 11/2001 | Stoppek | 29/888.042 |

(Continued)

FOREIGN PATENT DOCUMENTS

DE    513 636 C    12/1930

(Continued)

*Primary Examiner*—Michael Leslie
(74) *Attorney, Agent, or Firm*—Scully, Scott, Murphy & Presser, P.C.

(57) ABSTRACT

The invention relates to a hollow piston (1) for a piston engine, said hollow piston comprising a peripheral wall (3*a*), a central rod (11), a front wall (3*b*) on the front end thereof, and an articulated part 4*a*) on the rear end thereof. The inventive hollow piston (1) has an annular cavity (14) formed against the rod (11), between the peripheral wall (3*a*) and the articulated part (4*a*). A rear section of the cavity (14) forms a front section of the articulated part (4*a*). The aim of the invention is to stabilize the hollow piston while ensuring an efficient guidance of the piston. To this end, the rod (11) ends the region of the cavity (14), the articulated part (4*a*) is a cap-shaped articulation recess (4*c*), and the rear section of the cavity (14) forms at least part of the articulated surface (4*g*) of the articulation recess (4*c*).

20 Claims, 4 Drawing Sheets

U.S. PATENT DOCUMENTS 6,491,206 B2 * 12/2002 Stoppek .................. 228/114.5
6,703,577 B2 * 3/2004 Stoppek .................. 29/888.04

FOREIGN PATENT DOCUMENTS

| DE | 1 151 157 B | 6/1958 |
| --- | --- | --- |
| DE | 14 27 373 B | 6/1961 |
| DE | 38 04 424 C1 | 2/1988 |
| DE | 39 19 329 C1 | 6/1989 |
| DE | 197 06 075 A1 | 2/1997 |
| DE | 198 59 199 A1 | 12/1998 |
| DE | 199 38 046 A1 | 8/1999 |
| GB | 947060 | 4/1960 |

* cited by examiner

TUBULAR PISTON FOR A PISTON ENGINE AND METHOD OF MANUFACTURING THE SAME

CROSS REFERENCE TO RELATED APPLICATIONS

This application is based on PCT/EP04/09644, filed on Aug. 30, 2004, and claims priority of German Patent Application No. 103 41 791.5, filed on Sep. 10, 2003.

The invention relates to a tubular piston and to a method of manufacturing the same.

For various reasons, special requirements are imposed on a tubular piston of the present kind. For one thing, it is a mass product which is manufactured and distributed in large numbers. The reason for this is not only that a piston engine comprises a number of tubular pistons, but also that a tubular piston is a typical wearing part which has to be replaced after a certain service life. For these reasons, there are special requirements as regards simple, rapid and cost-effective manufacture.

In addition, the wear-resistance of the tubular piston depends, among other things, on its weight, which should be as low as possible in order to keep the centrifugal forces which accelerate wear as low as possible when the tubular piston is operating.

Another requirement consists in achieving a sturdy type of construction which withstands both the pressure loads that occur during operation and also bending loads and permits a reduction in weight with the most thin-walled type of construction possible. In this connection, it should be mentioned that a long piston superficies reduces both the surface pressure and also the pitching moment of the tubular piston.

A tubular piston of the kind indicated in the pre-characterising clause of claim 1 is described in DE 197 06 075 A1. This previously known tubular piston has a hollow-cylindrical piston shaft which extends in one axial direction from a tapered base section, while a joint part extends from said base section in the other axial direction in the form of a spherical head which is likewise of hollow construction. Passing through the entire tubular piston is a central pin which is a separate component which is pushed coaxially into said tubular piston in holes and is fixed therein. The base section is constituted by an annular formed-in portion in the peripheral wall of a piston blank, said formed-in portion being pressed against the superficies of the preferably hollow pin. Formed-in at the front end of the tubular piston is an annular end wall which emanates from the peripheral wall and is likewise formed against the superficies of the pin with its inner edge. The length of the pin is such that it passes through the tubular piston from the end wall as far as the rear end of the piston head, the peripheral wall constituting said piston head being likewise formed-in against the superficies of the pin in an annular manner. The formed-in portion at the front and rear is produced with a forming-in force which is so great that the hollow peripheral wall of the pin is likewise formed-in along the lines of a waist. As a result of this, the pin is axially fixed in the tubular piston. In this tubular piston, both the manufacture and also the warehousing for the pin which is to be incorporated as an additional component are expensive.

A tubular piston which can be inferred from DE 199 38 046 A1 differs from the tubular piston described above through the fact that the base of the tubular piston is not constructed by a formed-in portion but is of solid construction, the joint part is constituted by a dome-shaped joint recess which is open on the rear side, and the pin is formed onto the base part in the form of a hollow pin and extends in one piece towards the front end of the tubular piston where, once again, an end wall is formed-in against its superficies. This known tubular piston is made sturdier through the fact that the pin is formed onto the base section in one piece. The dome-shaped joint recess is formed into the rear side of the tubular piston by cutting.

The underlying object of the invention is to develop a tubular piston and a method of manufacturing the same in such a way that said tubular piston is made sturdier while guaranteeing that it is guided in a satisfactory manner.

This object is achieved by means of the features of claim 1 or claim 9. Advantageous further developments are described in the appertaining subclaims.

Underlying the invention is the knowledge that, in a tubular piston which is described in DE 199 38 046 A1 and has a rear joint part in the form of a dome-shaped recess, the superficies of the tubular piston masks said joint part and therefore a long, large superficies or guide surface is available for the tubular piston, along with a reduction in the tilting moment which acts on the latter under operating conditions, and this configuration should therefore be aimed at.

In the configuration according to the invention, the pin terminates in the region of the formed-in portion, which makes it possible to construct the joint part in the form of a dome-shaped recess. This lengthens and enlarges the superficies or guide surface of the tubular piston, under which circumstances the tilting moments that occur under operating conditions lie in the region of the guide surface and a harmful effect on the tubular piston which said tilting moments presuppose is substantially reduced. Moreover, a sturdy type of construction is guaranteed, on the one hand by a strengthening of the structure which takes place when forming-in occurs, and on the other hand by the fact that the formed-in portion and the pin are supported against one another, which makes the piston as a whole sturdier. Furthermore, in the configuration according to the invention, the rear part of the formed-in portion constitutes a front surface region of the joint recess. As a result of this, the rear region of the formed-in portion is available as a joint surface belonging to the axial supporting system. A spherical head which is seated in the joint recess is therefore supported axially not only via the outer wall of the tubular piston but also via the pin, and this contributes to the sturdy type of construction aimed at.

The method according to the invention described in claim 9 permits simple, rapid and cost-effective manufacture of the tubular piston, the piston manufactured by the said method likewise having the advantages described above.

A simple type of construction for the tubular piston is achieved if the pin extends in one piece from a front end wall of said tubular piston. In this case, the formed-in portion may be produced from a hollow-cylindrical piston blank which is prefabricated by cutting shaping or non-cutting shaping, for example by cold or hot extrusion.

The underlying object of the invention is, furthermore, to further develop a tubular piston according to the pre-characterising clause of claim 11, and a method according to the pre-characterising clause of claim 14, in such a way that said tubular piston is given a long, large superficies or guide surface.

This object is achieved by means of the features of Patent claim 11 or 14. Advantageous further developments are described in appertaining subclaims.

A long, large superficies or guide surface for the tubular piston is achieved through the fact that the formed-in portion is formed-in, not from a substantially hollow-cylindrical piston-prefabrication part, but from a prefabrication part with a prefabricated, external thickened portion of material, in such a way that said thickened portion is relocated from the outside towards the inside. As a result of this, it is possible to reduce a cavity which is constituted on the outside by the formed-in portion, and to enlarge the superficies or guide surface of the tubular piston. The said formed-in portion is preferably produced in such a way that, after the forming-in operation, the superficies or guide surface of the tubular piston extends in a continuous manner in the region of the formed-in portion. This can also be achieved precisely because of the fact that the formed-in portion is produced so as to be initially thicker, during the forming-in operation, than the outer dimensions of the tubular piston, and the said thickened portion is adapted, in a final phase of operation, to the outer dimension of the tubular piston (for example by grinding), and this can happen before or after hardening at least of the surface layer of said tubular piston.

In the course of operation of an axial piston engine according to the invention, considerable heating-up occurs in the region of the piston which is moving to and fro, that is to say in the piston itself and in the cylinder which guides it, which heating-up occurs because of the friction in the piston guides and leads, when the working pressure is high, to considerably high operating temperatures.

Also underlying the invention is the object of improving cooling in a tubular piston according to the pre-characterising clause of claim 20.

This object is achieved by means of the features in Patent claim 20. Advantageous further developments of the invention are described in appertaining subclaims.

In its rear end region, the tubular piston according to claim 20 has at least one duct which opens the cavity of the tubular piston towards the outside.

Underlying this configuration according to the invention is the knowledge that improved cooling can be achieved by an exchange of operating fluid which is located in the cavity of the tubular piston.

Although the exchange of operating fluid is relatively small when only one duct is present, centrifugal forces which improve the exchange of operating fluid in the tubular piston are nevertheless generated, under operating conditions, because of the movements of the pistons.

It is therefore advantageous to dispose, in the tubular piston, a number of ducts which are at a distance from one another which should be as large as possible as regards the exchange of operating fluid aimed at.

The at least one duct is to be disposed in such a way that its outer outlet aperture is open, at least at certain times during the operation of the piston, towards that cavity of the piston engine in which operating fluid or leakage fluid is located at low pressure. The exchange of operating fluid through the duct or ducts is guaranteed, under operating conditions, by the Plantsch-type movements of the operating fluid located in the cavity. As a result of the Plantsch-type movements, the operating fluid passes into all the regions of the cavity so that it is possible to proceed from an exchange of operating fluid which, although small, is nevertheless continuous, through the duct.

The subclaims contain features which contribute to making the piston and the joint connection sturdier and also to cooling, and which lead to simple configurations which can be manufactured cost-effectively.

Advantageous configurations of the invention will be explained in greater detail below with the aid of preferred exemplified embodiments and drawings. In the latter.

Figure 2:
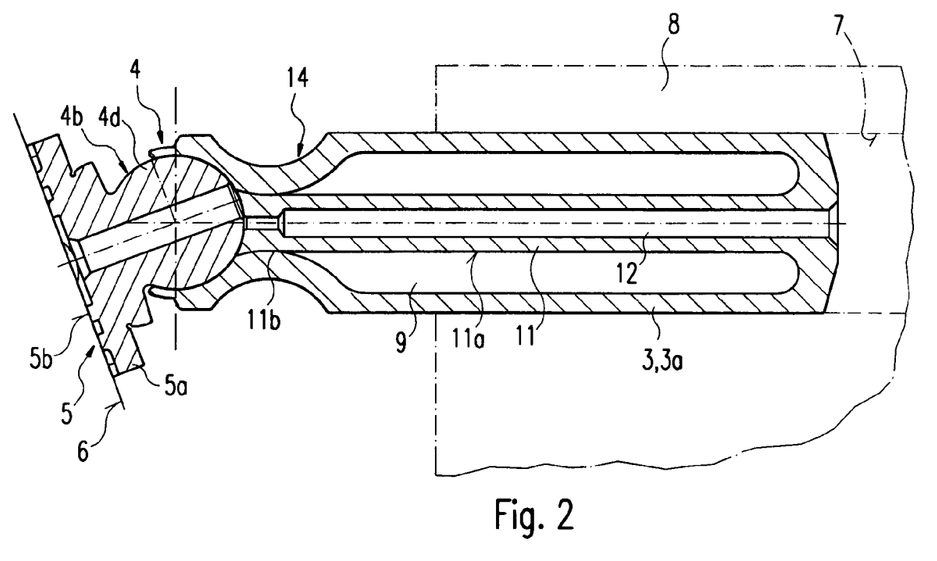
FIG. 2 shows a piston module which comprises a tubular piston according to the invention and a sliding shoe which is connected to the latter in an articulated manner.

The tubular piston, which is designated by 1, consists of a base section 2 from which a piston shaft 3 extends forwards in one axial direction and a joint part 4a extends rearwards in the other axial direction, which joint part is part of a ball-joint connection 4 which connects the piston 1, in a universally swivellable manner, to a sliding shoe 5 which has a corresponding joint part 4b. In all the exemplified embodiments, the joint part 4a on the piston 1 is constituted by a dome-shaped joint recess 4c into which a spherical head 4d on the sliding shoe 5 fits with little clearance of motion. The joint recess 4c is disposed at a depth such that its free edge 4e extends beyond the appertaining equatorial plane 4f and is formed-in in such a way that it engages, in a form-locking manner, behind the spherical head 4d with little clearance of motion. For this purpose, the free edge 4e can be compressed, as shown in FIG. 2, with its material in the cold or heated-up condition. In order to facilitate the compressing operation, the wall thickness of the free edge 4e may be tapered outwards in the region protruding beyond the equatorial plane 4f, and this can likewise be inferred from FIG. 2.

The sliding shoe 5 also has a base plate 5a which carries the spherical head 14d and whose flat base surface 5b constitutes a sliding surface with the aid of which the tubular piston 1 is supported, in the condition in which it is mounted in an axial piston engine, on a swash plate or wobble plate whose oblique surface is illustrated by a line 6. Under these circumstances, the piston shaft 3 is mounted so as to be displaceable to and fro longitudinally in a piston bore 7 belonging to a cylinder 8 which may be mounted in a rotatable or non-rotatable manner in a housing, not represented, belonging to the axial piston engine.

The cavity of the piston shaft 3, which cavity is designated by 9, is occluded at the rear end by the base section 2, on the periphery by a hollow-cylindrical peripheral wall 3a, and at the front end by an end wall 3b. The tubular piston 1 has a central pin 11 which extends from the end wall 3b as far as the base section 2, is supported axially and radially on the latter, and thereby makes the tubular piston 1 as a whole, and the end wall 3b, sturdier axially.

In the present exemplified embodiments, the pin 11 extends rearwards from the end wall 3b in one piece, right into the rear end region of the base section 2, as will be described below. A duct 12 extends in an axially continuous manner through the pin 11, a throttle 12a being disposed in said duct 12.

The base section 2 has a formed-in portion 14 which, in the exemplified embodiments according to FIGS. 1 to 6, is constituted by the annular forming-in of an axial section 3c of the peripheral wall 3a and, in the exemplified embodiments according to FIGS. 7 to 12, is constituted by the annular forming-in of an axial peripheral-wall section 3c which has an annular thickened portion of material 3d on the outside. In each case, the formed-in portion 14 is formed-in to an extent such that it presses radially inwards against the superficies 11a of the pin 11. As a result of this, the cavity 9 is occluded in a leakproof manner at the rear end. The formed-in portion 14 constitutes, with its rear stepped face 14a, at least part of the surface 4c of the recess.

Figure 1:
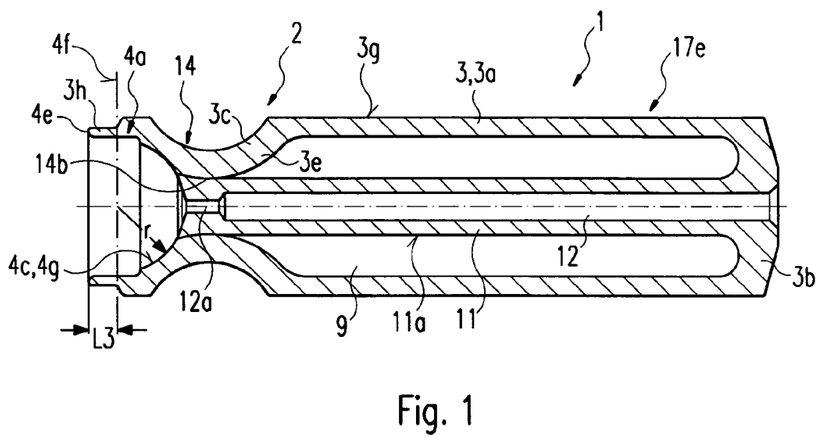
FIG. 1 shows, in axial section, a tubular piston according to the invention, in the form of a finished part for a piston.

The formed-in portion 14 according to FIGS. 1 to 6 can be formed-in by rotary swaging or rotary rolling with the aid of shaping tools 15a, 15b which are indicated in outline in FIG. 1 and each have a superficies 15c which is rounded convexly in cross-section, the deforming pressure, which is directed radially inwards, being exerted on the superficies of the tubular piston 1. The convexly rounded inner shoulder of material 3e, which presses radially inwards against the pin 11, is formed in the process.

Figure 7:
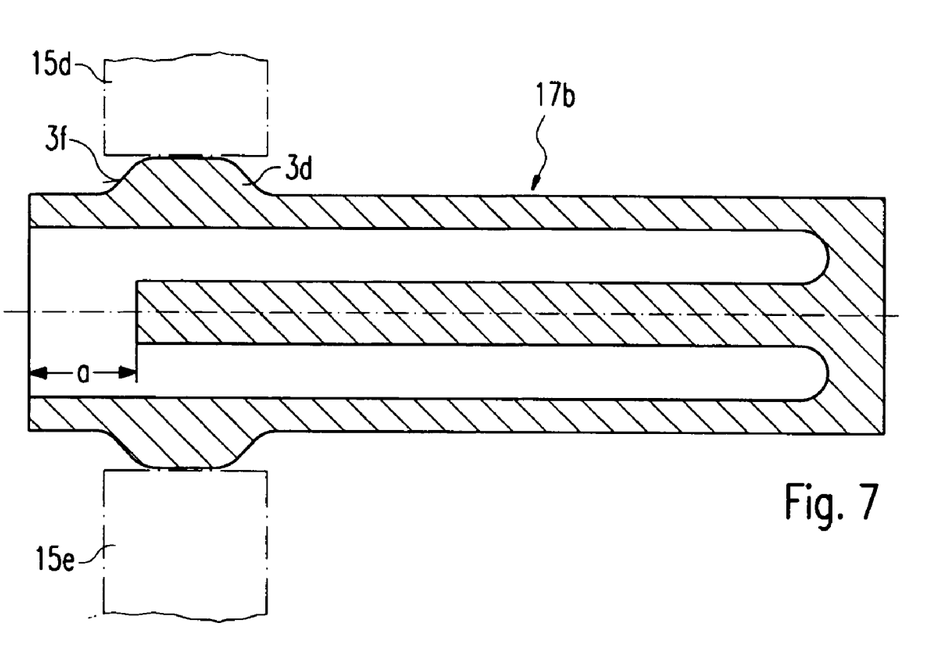
FIG. 7 shows a prefabrication part for a piston, in a second stage of prefabrication and in a modified configuration.

In the exemplified embodiment according to FIG. 7 and the subsequent figures, the formed-in portion 14 is formed-in radially inwards by cylindrical shaping tools 15d, 15e, under which circumstances the thickened portion of material 3d is completely formed-in and the annular inner shoulder of material 3e, which is likewise rounded convexly in cross-section and presses against the superficies 11a of the pin 11, is constructed. The volume of the thickened portion of material 3d approximately corresponds to the volume of the shoulder of material 3e.

For reasons connected with an advantageous flow of material during the forming-in operation, it is advantageous to construct the thickened portion of material 3d with lateral surfaces 3f of the ring which converge radially outwards. The angle of inclination of these lateral surfaces 3f of the ring may, for example, be about 45°.

In the case of all the exemplified embodiments, it is advantageous to produce the formed-in portion 14 with a compressive force which is directed radially inwards and is of a magnitude such that said formed-in portion 14 not only presses against the superficies 11a of the pin 11, but also produces, in the superficies 11a of said pin, a formed-in portion 11b in the form of an annular groove which may, for example, be rounded. This provides not only a clamping connection between the formed-in portion 14 and the pin 11, but a connection which operates in a form-locking manner and is capable of transmitting forces which are directed axially to a considerable extent, or of absorbing loads.

In order to have sufficient forces of resistance, which are directed radially outwards, in the pin 11, particularly in the case of a reinforced formed-in portion 14b of this kind, it is also advantageous to construct the throttle 13 with an increased wall thickness for the pin in the region of the formed-in portion 14, so that said pin 11 is able to put up a greater force of opposition, which is directed radially outwards, to the formed-in portion 14, and the latter can be produced with greater pressure contact of the material, as a result of which the reciprocal support and the sealing are improved.

The tubular piston 1 which has been described so far is a precision part, the superficies 3g of which is a locating surface and guiding surface for the longitudinal guidance of said tubular piston 1. This also applies to the inner surface 4g of the joint recess 4c, at least in the region of its rounded portion. It is therefore advantageous to construct the superficies 3g and the inner surface 4g, as regards their finished shape and size, with an oversize x which is brought to its final fitting size by a finishing operation, for example by turning, milling or grinding. The oversizes x are represented, for example in FIGS. 6 and 8 and subsequent figures.

Figure 5:
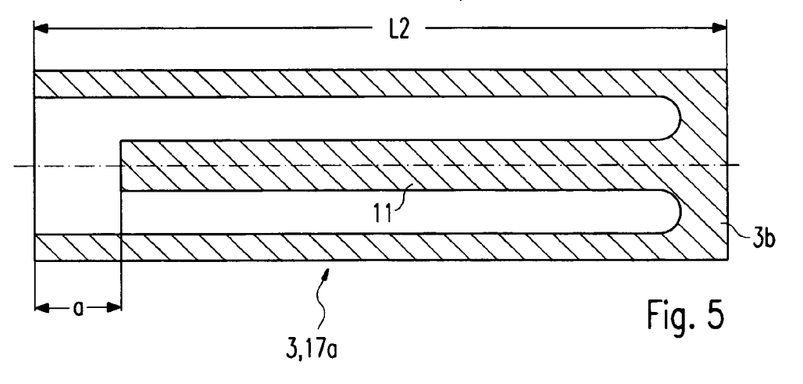
FIG. 5 shows a prefabrication part for a piston, in a second stage of prefabrication.
Figure 6:
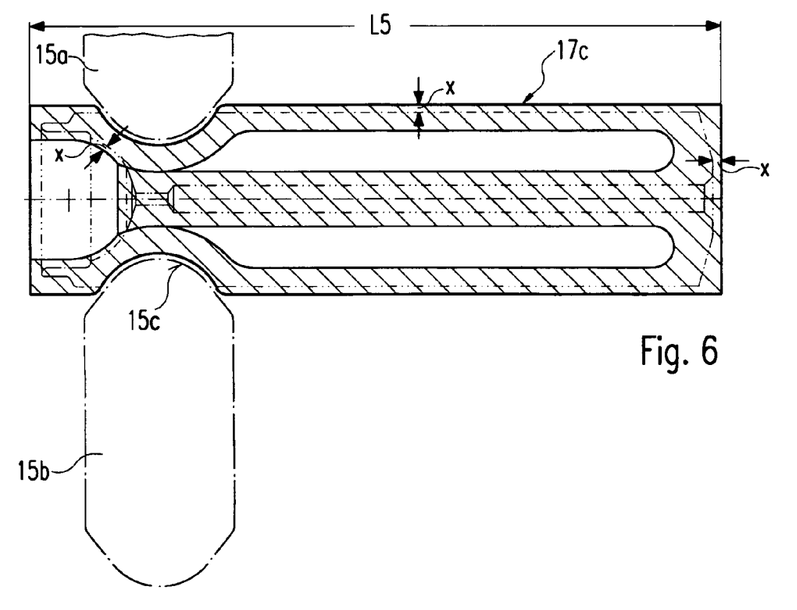
FIG. 6 shows a prefabrication part for a piston, in a third stage of prefabrication.

A tubular piston which has been prefabricated to this extent is represented in FIG. 6 as a prefabrication part for a piston. In this connection, the prefabrication can take place in a number of stages and by different methods of production, as is shown, on the one hand, in FIGS. 3 and 5 and, on the other, in FIGS. 4 and 5.

Figure 3:
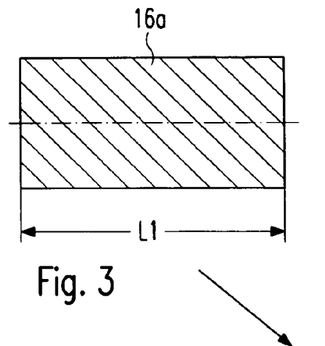
FIG. 3 shows a blank for a tubular piston according to the invention, in a first stage of prefabrication.

In the exemplified embodiment according to FIG. 3, there is prefabricated, in a first stage of prefabrication, a blank 16a which differs from the prefabrication part 17a belonging to the second stage of prefabrication particularly in having a small axial length L1 which is substantially smaller than the length L2 of the prefabrication part 17a belonging to the second stage of prefabrication. The blank 16a may be produced by cutting, for example by cutting a bar-shaped semi-finished product to length. Said blank 16a is deformed in a non-cutting manner to form the prefabrication part 17a, by extrusion in an extruding tool which is not represented. The extruding operation may take place in the cold condition (for example at room temperature) or in the hot condition (for example, heated up to a favourable flow temperature). The peripheral wall 3a and the pin 11 are extruded in the extruding operation, in the course of which the end wall 3b is constructed. The extruding operation takes place in such a way that the pin 11 is shorter than the peripheral wall 3a and its rear free end is therefore at an axial distance a from the rear free end of the peripheral wall 3a. Said distance a approximately corresponds to the radius r of the joint recess 4c plus the length L3 by which the section 3h of the peripheral wall projects rearwards beyond the equatorial plane 4f.

Figure 4:
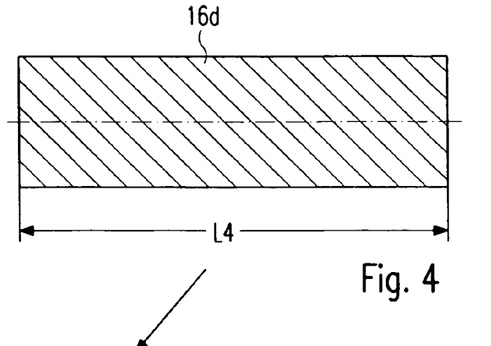
FIG. 4 shows a blank for a tubular piston according to the invention, in a first stage of prefabrication and in a modified configuration.

Alternatively, the prefabrication part 17a may be produced from a blank 16b according to FIG. 4 by cutting, for example by boring an annular hole. This cutting-type production results, at least on the superficies of the pin 11 and on the inner superficies of the peripheral wall 3a, in furrows which extend in the peripheral direction and which can impair the strength of the finished tubular piston 1. On the other hand, the pin 11 and the peripheral wall 3a are strengthened and made sturdier during extrusion, in the course of which fibres of material which extend longitudinally and which further increase the strength of the material are also constructed.

In the exemplified embodiment according to FIG. 4, the length L4 of the blank 16d approximately corresponds to the length L2 of the prefabrication part 17a, which is represented on an enlarged scale.

The prefabrication of the modified prefabrication part 17b according to FIG. 7 may take place in the manner described above from blanks according to FIGS. 3 and 4, likewise by extrusion or by cutting-type production. In order to avoid repetition and to shorten the description, the reader is therefore referred to that part of the description.

Figure 8:
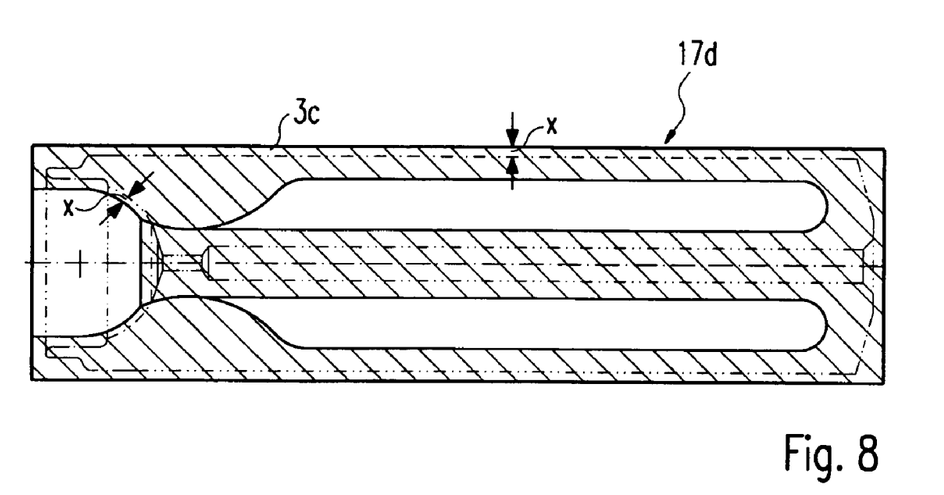
FIG. 8 shows a prefabrication part for a piston, in the third stage of prefabrication and in a modified configuration.

In the ongoing production of the prefabrication part 17a according to FIG. 5 in the third stage of prefabrication to form the prefabrication part 17c according to FIG. 6, or in the ongoing production of the prefabrication part 17b according to FIG. 7 in the third stage of prefabrication to form the prefabrication part 17d according to FIG. 8, a formed-in portion 14 is formed-in in each case, and this takes place by means of the rounded shaping and counter-shaping tools 15a, 15b according to FIG. 1 or the approximately cylindrical shaping and counter-shaping tools 15d, 15e according to FIG. 7.

The volume of the thickened portion of material 3d is predetermined to be of a size such that, after the forming-in of the formed-in portion 14, the prefabrication part 17d (FIG. 8) is approximately cylindrical, that is to say including the oversize x.

The formed-in portion 14 is formed in, in each case, in such a way that it borders the joint recess 4c with its rear stepped surface 14a, that is to say, taking into account the oversize x. In a comparable manner, the pin 11 may also be prefabricated with a distance a such that said pin likewise borders the joint recess 4c on the front side of the latter, that is to say, likewise taking into account the oversize x. Alternatively, however, the distance a may also be of larger dimensions, so that although the pin 11 borders the joint recess 4c on the front side, it nevertheless does not constitute the latter's spherical bearing surface but is at an axial distance, not represented, from the said spherical bearing surface (surface finally constructed). This is likewise possible because the inner shoulder of material on the formed-in portion 14 constitutes a sufficiently large bearing surface for the joint recess 4c, so that the end face of the pin 11 can protrude forward from the said finished bearing surface.

In a further stage of prefabrication, the superficies 3g and the pivoting or inner surface 4g of the joint recess 4c, and optionally the end face of the end wall 3b too, may be machined to final size by a cutting method, and this may take place, for example, by milling or grinding. In this connection, hardening of the material of the tubular piston 1, for example surface-hardening, preferably by nitriding, may take place before or after this fine-machining to final size.

After that, the finished piston part 17e according to FIG. 1 which has been produced so far can be put together with the sliding shoe 5 and connected in a form-locking manner by the forming-in of the peripheral wall section 3h, as a result of which the piston module according to FIG. 2 is formed.

The manufacturing measures mentioned above also apply in a corresponding manner to the exemplified embodiment according to FIG. 8.

Figure 9:
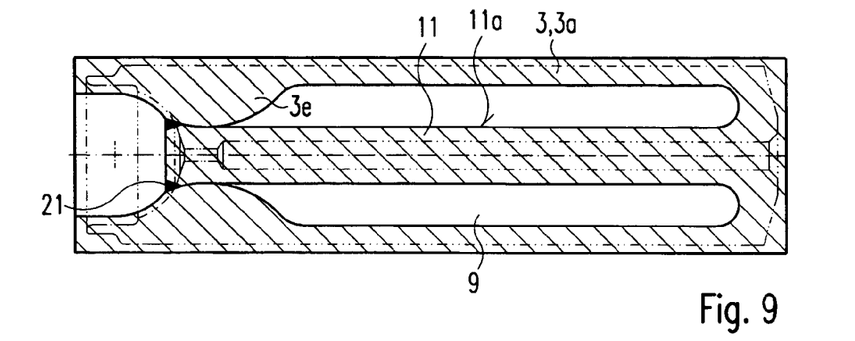
FIG. 9 shows a prefabrication part for a piston, in the third stage of prefabrication and in a configuration which has been modified further.
Figure 10:
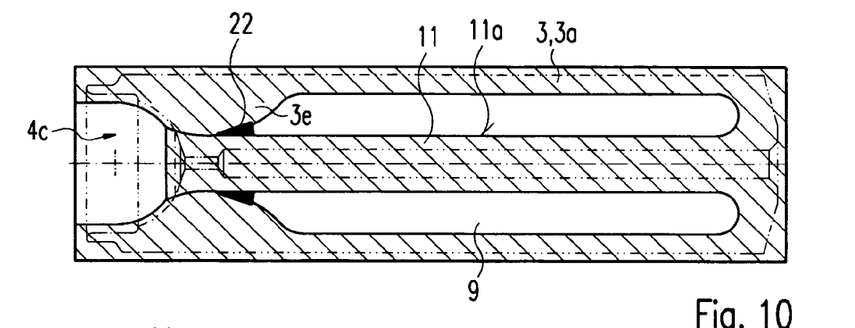
FIG. 10 shows the prefabrication part for a piston, in the third stage of prefabrication and in a configuration which has been modified further.
Figure 11:
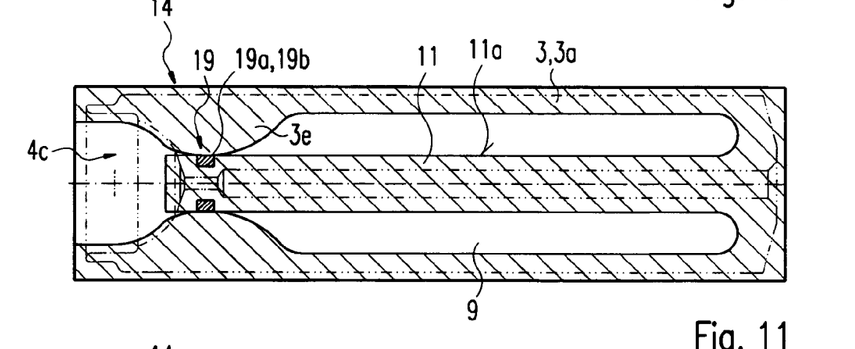
FIG. 11 shows the prefabrication part for a piston, in the third stage of prefabrication and in a configuration which has been modified further.

FIGS. 9 to 11 show other production measures which serve to make sturdier and/or seal the connection between the formed-in portion 14 and the pin 11.

In the exemplified embodiment according to FIG. 9, the pin 11 is welded to the formed-in portion 14. The welding seam 21 may lie in the region of the junction between the pin 11 and the formed-in portion 14 and be produced before or after machining to final size has been carried out.

In the exemplified embodiment according to FIG. 10, the pin 11 and the formed-in portion 14 are soldered to one another, and this may take place at the stepped surface on the front side (see FIG. 10) or at the stepped surface on the rear side. If soldering 22 is carried out on the front side, a solder which is required for soldering purposes is to be fed into the cavity 9 prior to the forming-in of the formed-in portion 14.

In the exemplified embodiment according to FIG. 11, the junction which exists between the pin 11 and the formed-in portion 14 is sealed by means of a seal 19. Said seal 19 is preferably constituted by a sealing ring 19a which is seated in an annular groove 19b and interacts in a sealing manner with the annular surface lying opposite. Said annular groove 19b may be disposed in the superficies 11a of the pin 11 or in the inner superficies of the formed-in portion 14.

Figure 12:
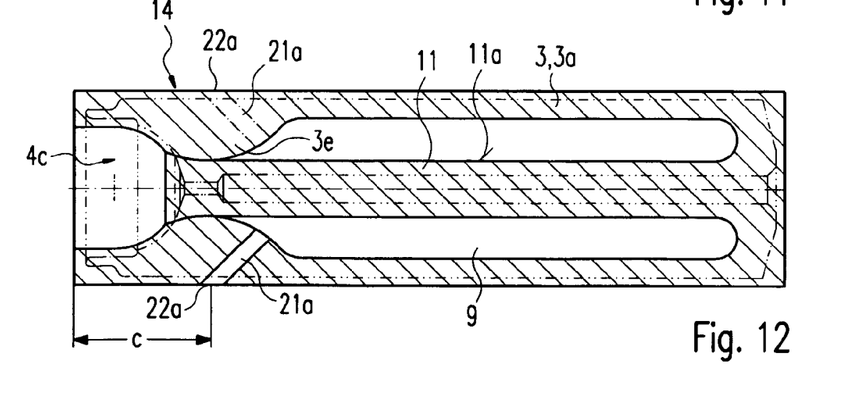
FIG. 12 shows the prefabrication part for a piston, in the third stage of prefabrication and in a configuration which has been modified further.

The exemplified embodiment according to FIG. 12 shows the following special configuration, which may be constructed in a tubular piston 10 which has been described above, or even in tubular pistons having a different type of construction.

In this configuration, the cavity 9 is connected to the environment of the tubular piston through a duct 21 whose outer outlet aperture 22 is located in the rear end region of said tubular piston 1. The outlet aperture 22 may be positioned in such a way that, when a piston engine, in particular an axial piston engine, having the tubular piston 1 is operating, said aperture passes out of the cylinder 8 and into the cavity of the housing of said piston machine at least temporarily under stroke-type operating conditions. This is the case when the outlet aperture 22 is located temporarily, under stroke-type operating conditions, in the piston guide, in which it is substantially masked by the piston superficies of the piston bore 7 and, in the region of the rear dead centre of the piston stroke, is in communication with the cavity of the housing, for example projects rearwards out of the piston bore 7.

The advantage of this configuration of the tubular piston 1, which is independent of the exemplified embodiments described above, consists in the fact that an exchange takes place, through the duct 21, between the hydraulic fluid located in the cavity 9 of the tubular piston 1 and the fluid in the cavity of the housing. As a result of this, the cooling of the tubular piston is improved.

One or more ducts 21 disposed in a manner distributed over the periphery may be provided, as is represented in outline in FIG. 12 by chain-dotted lines. As a result of this, the exchange of fluid is improved and increased. If, when the tubular piston 1 is operating, there are located, in a manner lying radially on the inside and radially on the outside, at least one duct 21 in each case, the exchange of fluid can take place as a result of a conveying action which is brought about by centrifugal force and which accelerates the exchange of fluid.

In the exemplified embodiment, the at least one outer outlet aperture 22 is located at a distance c from the rear side of the tubular piston 1 which is smaller than half the length L5 of the piston and preferably about ⅕ of said length L5.

The invention claimed is:

1. Tubular piston for a piston engine, which piston has a peripheral wall, a central pin, an end wall at its front end and a joint part at its rear end, wherein said tubular piston has, between the peripheral wall and the joint part, an annular formed-in portion which is formed against the pin, and wherein a rear section of the formed-in portion constitutes a front section of the joint part,
wherein
the pin terminates in the region of the formed-in portion,
the joint part having a dome-shaped joint recess,
the rear section of the formed-in portion constituting at least part of a joint surface belonging to the joint recess, and
wherein the pin constitutes, as its rear end, part of the joint surface of the joint recess.

2. Tubular piston for a piston engine, which piston has a peripheral wall, a central pin, an end wall at its front end and a joint part at its rear end, wherein said tubular piston has, between the peripheral wall and the joint part, an annular formed-in portion which is formed against the pin, and wherein a rear section of the formed-in portion constitutes a front section of the joint part,
wherein
the pin terminates in the region of the formed-in portion,
the joint part having a dome-shaped joint recess, the rear section of the formed-in portion constituting at least part of a joint surface belonging to the joint recess, wherein the peripheral wall and/or the pin is/are constructed in one piece with the end wall, and wherein the end wall and the peripheral wall and/or the pin are formed onto one another in a non-cutting manner.

3. Tubular piston according to claim 1 or claim 2, wherein
the pin has a duct passing axially therethrough.

4. Tubular piston according to claim 3, wherein
the duct has a throttle which is disposed in the region of the formed-in portion.

5. Tubular piston according to claim 1 or claim 2, wherein
the formed-in portion is pressed into the superficies of the pin.

6. Tubular piston according to claim 1 or claim 8, wherein
the junction between the formed-in portion and the pin is sealed by, selectively, a welding seam or a soldering seam or a ring seal.

7. Tubular piston according to claim 1, which is closed at its front end by said end wall, wherein
a cavity between said central pin and peripheral wall is open towards the outside through a duct having an aperture that is disposed in the rear end region of the tubular piston; and wherein the duct extends rearwardly and concurrently obliquely towards the outside.

8. Tubular piston according to claim 7, wherein
the duct opens onto the outer superficies of the tubular piston.

9. Tubular piston for a piston engine, which piston has a peripheral wall and a central pin, an end wall at its front and a joint part at its rear end, which peripheral wall includes an annular formed-in portion which is directed against the superficies of said pin, wherein the formed-in portion contains a thickened portion of material and is in alignment, at its outer periphery, with the remainder of the region of the superficies of the piston, wherein lateral surfaces of the thickened portion of material extend in an outwardly convergent manner, said pin terminating in the region of the formed-in portion
the joint part having a dome-shaped recess,
the rear section of the formed-in portion constituting at least part of a joint surface belonging to the joint recess, and
said pin constituting, at its rear end, apart of the joint surface of said joint recess.

10. Tubular piston according to claim 1 or 9, which is closed at its front end by said end wall, wherein a cavity between said central pin and peripheral wall is open towards the outside through at least two ducts having apertures that are disposed in the rear end region of the tubular piston, and wherein said ducts are distributed over the periphery of said tubular piston.

11. Tubular piston according to claim 10, wherein each of said ducts open onto the outer superficies of the tubular piston.

12. Method of manufacturing a tubular piston having a peripheral wall, a central pin, an end wall at its front end and a joint part at its rear end, in which an annular formed-in portion of the peripheral wall is formed against the superficies of the pin, wherein
the joint part is formed as a dome-shaped joint recess,
the pin is constructed with a length such that it terminates in the region of the formed-in portion, and
the formed-in portion is formed whereby the rear section thereof constitutes at least part of a joint surface belonging to the joint recess.

13. Method according to claim 12, wherein
the peripheral wall is prefabricated with a thickened portion of material in the region of the formed-in portion and is formed-in with the thickened portion of material, whereby its outer peripheral surface is substantially in alignment with the rest of the outer peripheral surface of the peripheral wall.

14. Method according to claim 13, wherein
the thickened portion of material is prefabricated with convergent lateral surfaces.

15. Method according to claim 12, wherein
the peripheral wall is prefabricated with a cross-sectional oversize (x) and the formed-in portion is formed-in whereby the outer peripheral surface thereof corresponds to said oversize (x).

16. Method according to claim 12, wherein the pin is constructed with a length forming at the rear end thereof, part of the joint surface of the joint recess.

17. Method according to claim 12, wherein
the formed-in portion is pressed into the superficies of the pin.

18. Method according to claim 12, wherein
the peripheral wall is prefabricated with a thickened portion of material in the region of the formed-in portion, and is formed-in, with the thickened portion of material, having the outer peripheral surface thereof substantially in alignment with the remainder of the outer peripheral surface of the peripheral wall.

19. Method of manufacturing a tubular piston for a piston engine, said piston having a peripheral wall, a central pin and a joint part at its rear end, comprising producing a formed-in portion in said piston in the peripheral wall edge of an end wall at the front end of said piston, and against the superficies of the pin, wherein
the peripheral wall is prefabricated with a thickened portion of material in the region of the formed-in portion, and is formed-in, with the thickened portion of material, having an outer peripheral surface in substantially alignment with the remainder of the outer peripheral surface of the peripheral wall.

20. Method according to claim 19, wherein the thickened portion of material is prefabricated with convergent lateral surfaces.

* * * * *